Dec. 18, 1928.  1,695,799
C. L. DAUN
METHOD OF PRODUCING INTEGRAL BAR WINDINGS
IN THE ROTORS OF ELECTRIC MOTORS
Filed Aug. 14, 1923

WITNESS:
Fred Palm
DEL.

INVENTOR.
Carl L. Daun,
BY
Erwin, Wheeler & Woodard
ATTORNEYS.

Patented Dec. 18, 1928.

1,695,799

UNITED STATES PATENT OFFICE.

CARL L. DAUN, OF MILWAUKEE, WISCONSIN, ASSIGNOR, BY MESNE ASSIGNMENTS, TO AMERICAN ELECTRIC MOTOR COMPANY, OF MILWAUKEE, WISCONSIN.

METHOD OF PRODUCING INTEGRAL BAR WINDINGS IN THE ROTORS OF ELECTRIC MOTORS.

Application filed August 14, 1923. Serial No. 657,374.

The invention relates to an improvement in the manner of arranging the bar windings of the rotor of an electric motor, so that an integral structure is produced, the purpose of such improvement being the elimination of the usual joints in the construction of multi-part similar windings, in which latter the contact is frequently imperfectly made with the result that the passage of the current is impeded and the resistance such that frequently the motor becomes heated in an entirely unnecessary degree.

The rotor is of the laminated type, the thin metal discs composing which are provided at their peripheral margin with a circular row of radially extending slots, or bar receiving openings of other form. In the older constructions the bars of low resistance which are inserted in the slots or other openings formed by the assembly of the notched discs and which extend parallel to the axis of the rotor are connected to the rings which abut them at their ends by means of spot welding or otherwise. But in any form of construction in which subsequent application and connection of the rings to the ends of the bars is made, contact is not always effected as completely as is to be desired. A defective connection is therefore productive of faulty operation of the motor, as before indicated.

The defects which sometimes inhere to the older structures are wholly obviated in the present invention, in which the bars and the rings are incorporated into an integral structure of uniform conductivity, so that resistance to the pressure of the current is avoided. These results are attained by employing an electric arc to fuse the bar windings and rings so that metals of the same character composing them are amalgamated as one.

The manner in which and the means whereby this condition may be attained will now be described, and the novelty of the invention will be pointed out in the appended claims.

Figure 2:
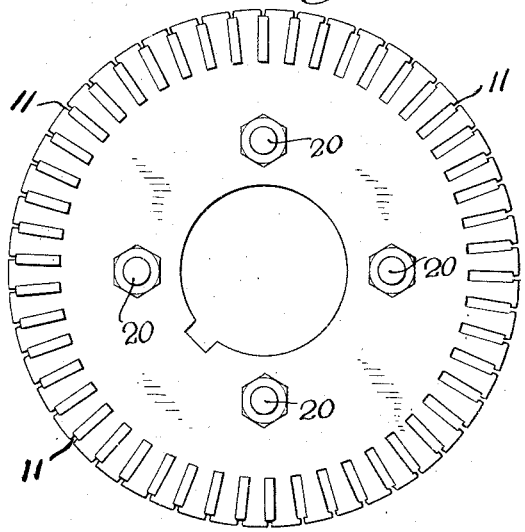
Fig. 2 is an end view of the rotor with the bars in position.
Figure 3:
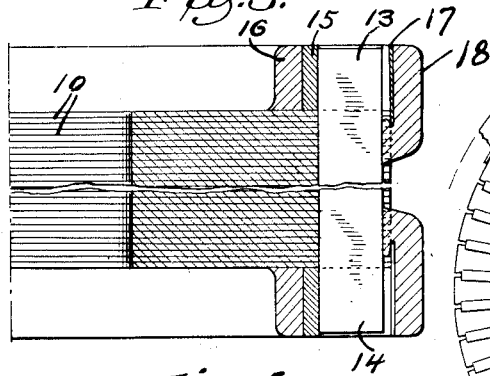
Fig. 3 is an enlarged sectional view on the line 3—3, Fig. 4, in the axial plane of the rotor, and showing the parts in position for the welding operation, whereby the bar winding is constituted as an integral structure.
Figure 4:
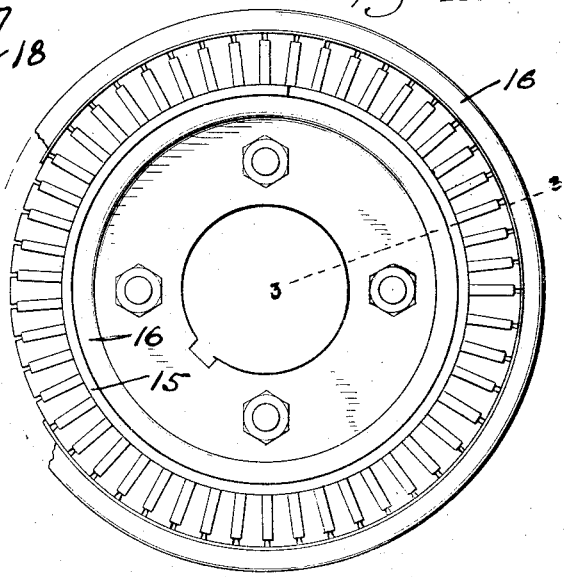
Fig. 4 is an end view of the rotor disclosing the comprehensive arrangement of the details shown in Fig. 3.
Figure 5:
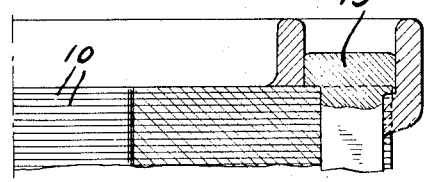
Fig. 5 is a fragmentary view similar to Fig. 3 showing the structure at the conclusion of the integral welding operation.

Referring to the drawing, the numeral 10 indicates the thin sheet metal discs, each of which will have the contour conventionally shown in Fig. 2. In the punching or dieing-out operation these discs are given a circular form and are provided at their border with a circumferential series of radially extending notches 11. In the same operation, the rotor shaft opening with its key seat and the holes in which are inserted the bolts for holding the discs in their assembled state to constitute the rotor body are punched.

Figure 1:
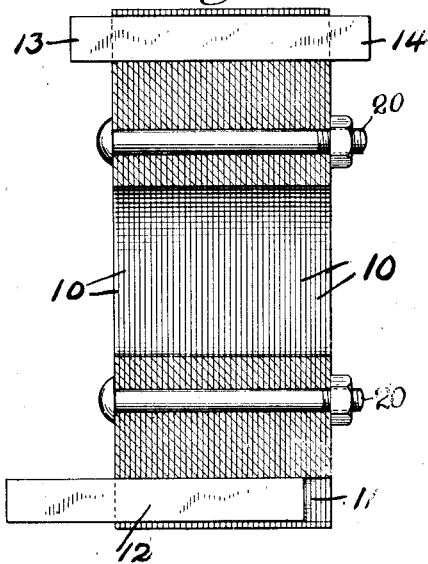
Figure 1 is a central sectional view through a laminated rotor or armature core showing in elevation some of the bar windings and the manner in which they are inserted in the radial slots in the assembled discs of which the rotor is composed.

After the discs 10 have been punched, a desirable number of them are assembled and initially clamped together by means of the bolts 20, as shown in Figs. 1 and 2, whereupon the bar windings 12 are inserted in the axially extending slots formed by the aligned notches in the laminated body. In accordance with the invention, the length of the bars exceeds that of the rotor so as to project slightly beyond at each end, as indicated at 13 and 14, such extending ends forming a circle at each end of the rotor concentric with the axis thereof.

An annulus 15 having the composition of the bars 12, and approximating in width the length of the projecting ends of the bars and having a diameter equal to the inner circle formed by the said ends, may be fitted therein. The primary purpose in thus locating the annulus is to provide a support for the inner dam, which in connection with the outer dam, confines the flow of the fused metal, as will be described; its secondary purpose is to supply additional material in the welding operation. An inside circular dam 16 of carbon paste is then placed in the angle formed by the end of the rotor and the inner side of the ring 15. A band 17 of suitable material such as paper is wrapped about the exterior of the projecting ends of the bars to support the outer dam, and an outside circular dam 18 of like substance as before is formed circumferentially about the end of the rotor and the projecting ends of the bar windings, and flush with the periphery of the rotor.

Figure 6:
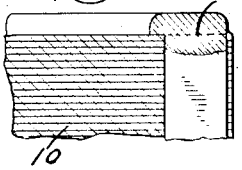
Fig. 6 is a like fragmentary sectional view showing the finished winding.

The ring 15 and the projecting ends of the bar windings are then fused by the application of an electric arc, so as to melt down the parts and unite them so as to constitute the integral structure 19 which it will be observed, bears directly against the end of the rotor body by reason of the overlapping of the slotted area thereof. Extensive experiments have demonstrated that the employment of the electric arc in effecting such fusion is productive of very superior and satisfactory results, not attained by other methods. The other end of the rotor is then treated in the same manner. The ring 15 may be omitted, and the inner dam support may be formed as a band of paper. After removal of the dams the integral structures thus produced are finished by turning or grinding away the surplus material, to produce the configuration shown in Fig. 6, and constitute the winding in its proper proportions.

It will be seen that the practice set forth enables the production of an integrally formed bar winding, in which there exist no joints which by reason of any defect in contact would result in an imperfect connection, and in which there is no impedance or resistance to the pressure of the electric current. As a result of the improved integrally formed connection, the liability to unduly heat the motor from this cause while in operation is entirely eliminated.

The arrangement of the rings 15 contributes the desired amount of welding material to enable the integral structure to have its correct proportions, but it will be within the scope of the invention to form the projecting ends of the bars in such length as to supply the necessary amount of welding material to produce the connecting rings of the integral structure when the said bar ends are reduced in the fusing operation. Or the additional material may be loosely applied to ends of the bars and fused with such ends in the welding operation.

Although the bar windings are shown in rectangular cross-section, it is obvious that the cross-sectional contour of the bars may be other than as shown.

Having thus described my invention, what I claim and desire to secure by Letters Patent of the United States, is:

1. The method of producing a laminated rotor with integral bar windings, which comprises, initially uniting a plurality of discs to form a laminated core having peripheral slots, inserting metallic bars in said slots so that the bar ends project beyond the opposite end laminations of said core, and fusing the metal of said bar ends to form integral rings bearing directly against said end laminations.

2. The method of producing a laminated rotor with integral bar windings, which comprises, initially uniting a plurality of discs to form a laminated core having peripheral slots, inserting metallic bars in said slots so that the bar ends project beyond the opposite end laminations of said core, placing additional fusible metal in proximity to said bar ends, and fusing the metal of said bar ends and of said added material to form integral rings bearing directly against said end laminations.

3. The method of producing a rotor with integral bar windings, which comprises, inserting a circular series of metal bars about the periphery of a rotor body with the ends of said bars projecting beyond the end of said body, and fusing the metal of said bar ends to form an integral ring connecting said bars and bearing against the end of said body.

4. The method of producing a rotor with integral bar windings, which comprises, inserting a circular series of metal bars about the periphery of a rotor body with the ends of said bars projecting beyond the end of said body, applying a pair of dams to said body coacting to form an annular channel encompassing said bar ends and open to said body, and fusing the metal of said bar ends within said channel to form an integral ring connecting said bar ends and bearing against said body.

5. The method of producing a rotor with integral bar windings, which comprises, inserting a circular series of parallel bars with the body of a rotor with the ends of said bars projecting beyond the end of said body, applying a pair of dams to said body to form an annular channel encompassing said bar ends and open to said body, placing a metal ring within said channel adjacent said bar ends, and fusing the metal of said ring and bar ends to form a ring integral with said bars and bearing against said body.

In testimony whereof, I have signed my name at Milwaukee, this 10th day of August, 1923.

C. L. DAUN.